Sept. 20, 1960 L. RUESS 2,953,032
V BELT SHEAVE FOR A STEPLESS V BELT TRANSMISSION, ESPECIALLY
FOR MOTOR VEHICLES
Filed July 25, 1958
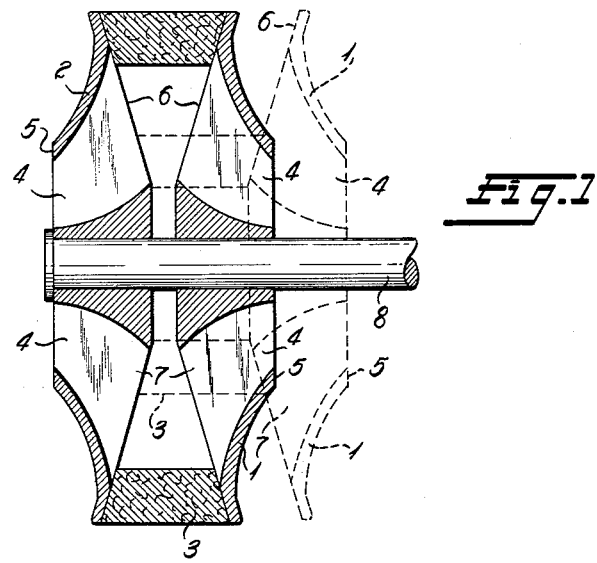
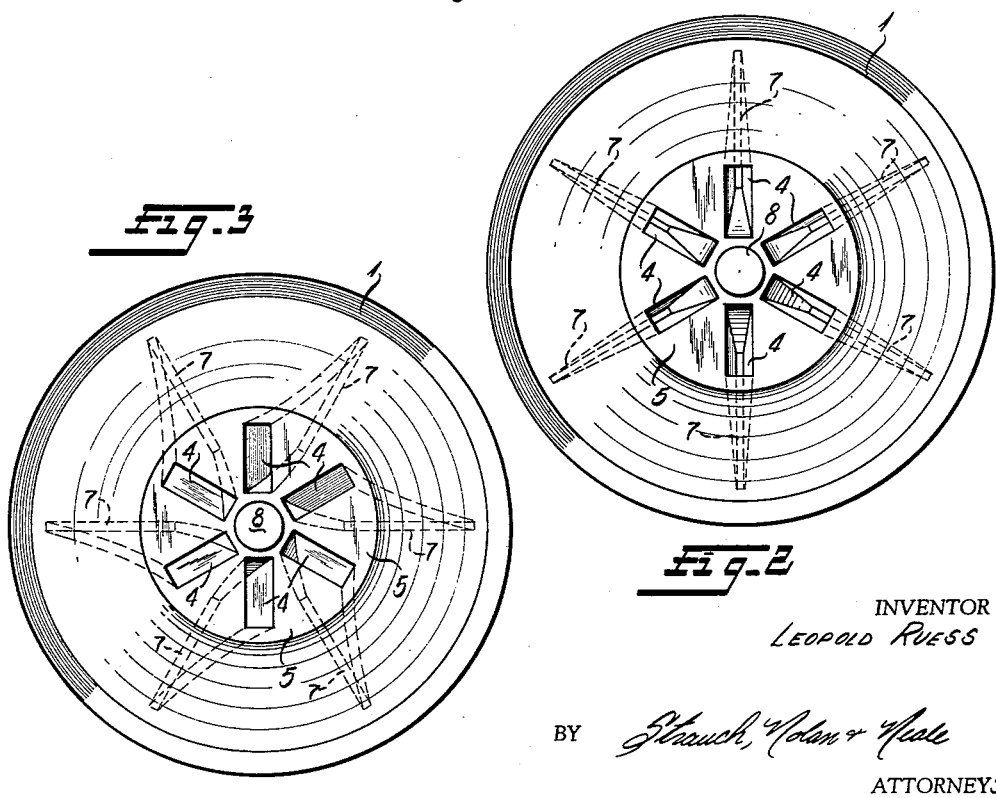
INVENTOR
LEOPOLD RUESS
BY
ATTORNEYS

United States Patent Office 2,953,032
Patented Sept. 20, 1960

2,953,032

V BELT SHEAVE FOR A STEPLESS V BELT TRANSMISSION, ESPECIALLY FOR MOTOR VEHICLES

Leopold Ruess, Munich, Germany, assignor to Rockwell G.m.b.H., a corporation of Germany Filed July 25, 1958, Ser. No. 751,084

9 Claims. (Cl. 74—230.6)

For V-belt transmissions, especially those which, due to their application for example in motor vehicles as motorcycles or the like, because of the great danger of soiling must be cased, the cooling of the V-belt which by the steady pressing work and the unavoidable slip is highly warmed, causes considerable difficulties.

One has tried to cool the V-belt by currents of air entering the gear housing through openings when driving, and by the arrangement of fans on the vari-pitch sheaves, but the result was unsatisfactory, as the current of cooling air was not directed towards the V-belt, but the whole air in the gear box was only whirled about or partly replaced by fresh air. As herewith a sufficient cooling effect could not be obtained, one has if any possible, left open the V-belt drive with the result that on account of the great soiling an adequate wear of the belt and above all of the vari-pitch sheaves took place.

There is also the possibility to use a part of the air current of an air blower provided for the cooling of the engine, or to arrange a separate air blower for the cooling of the belt. This necessitates, however, a considerable constructive effort in order to lead the current of cooling air to those places of the V-belt drive where heat is generated, and causes a reduction of the effective force of the motor.

The invention relates to a vari-pitch sheave consisting of two disks, for variable V-belt transmissions wherein channels for directing the cooling air are provided in at least one disk, and wherein a good cooling of V-belt transmissions is effected by directing the current of cooling air directly to the belt. For obtaining this effect the channels are ascending from the outside to the inside of the disk towards the external circumference of the disks and open into the openings at the inside of the disk. By this construction of the channels the air in the proximity of the hub of the disk is on account of the centrifugal force flung inwards through the channels against the belt and cools it on the places where heat is generated, i.e. in the pressing zone and at the lateral contact faces. On account of the relatively high number of revolutions, for example when applying the belt transmission for the stepless drive of motorcycles, motor scooters and motorized bicycles, there occurs a considerable cooling effect.

It is true, there are known vari-pitch sheaves with radial or slightly curved slots wherein the two disks can penetrate one another so that they can come closer to one another as this would be the case with solid disks. Herewith a bigger range of ratios is obtained without there being necessary broader belts. These known vari-pitch sheaves have thus not been suggested to obtain a cooling of the belt. It may be said that there is a small cooling effect; this must, however, remain unimportant, because the slots in each disk are covered up more as the distance between the disks is made smaller. Moreover there is no air current directed to the belt, but in the main there is only a more or less intensive whirling of the air by which an effective cooling of the belt cannot be effected. Above all the greatest part of the motioned air is hurled in radial direction on the outsides of the disk and thus does not touch the belt. Moreover these sheaves are only applicable for drives with a low number of rotations, as on high rotative speed, for instance in motors of vehicles, there would be on account of the broad slots an additional pressing work of the belt in transverse direction with the result of greater development of heat and an early destruction of the belt.

According to another suggestion of the invention the openings of the channels at the inside of the disks are in the main radially arranged slots with such breadth that a deformation of the V-belt cannot occur. If the slots would be made too broad, there would be in case of high rotation arise the disadvantages mentioned above. Moreover the contact face of the belt at the disks would be decreased too much which would probably result in a bigger slip, for the prevention of which there would be necessary a higher specific pressure per unit of area that would reduce adequately the life time of the belt.

In order to improve the cooling of the belt the channels in the disks are against the direction of rotation arranged ascendantly. Herewith the entrance of the air into the channels is improved. Moreover, for obtaining a nozzle effect, the cross-section of the channels can be bigger on the outside than on the inside of the disk.

The cooling channels are reasonably formed when casting the disks of the pitch sheaves so that additional operations are avoided. On principle it is, however, possible too, to produce the cooling air channels by separate castings or other form parts welded or otherwise secured to the disks of the vari-pitch sheaves, as for instance metal sheets, or by milling into the finished disks of the vari-pitch sheaves.

The drawing shows embodiments of the invention on principle.

Figure 1 is a vertical section through the vari-pitch sheave of the present invention showing the belt lying on the inner circumference of the sheave in dotted lines;

Figure 2 is a right side elevation of the assembly of Figure 1; and

Figure 3 is a side elevational view similar to Figure 2 showing a modification of the sheave air channels.

The vari-pitch sheave consists of the two disks 1 and 2, between which the V-belt 3 is running. The arrangement of two disks such as 1 and 2 on a shaft 8 in a manner that both rotate with said shaft while one can be displaced along the shaft axis with respect to the other which is fixed, is well known in the art, and is not in itself a part of this invention. In the disks 1 and 2 of the sheaves channels 4 are provided which ascend from the outsides 5 of the disks to the insides 6 towards the external circumference of the sheaves. The openings 7 of the channels 4 on the inside 6 are formed like slots and in the main arranged radially. As can be seen from the drawing the cross-sectional area of the channels 4 is bigger on the outside 5 than on the inside 6 of the disks. This effects an acceleration of the air current.

The channels 4 need not, as shown in Fig. 1 and Fig. 2, run in radial planes, but they may, as shown in Fig. 3, be inclined favorably against the rotation direction and have any cross-sectional form. The rectangular form of the openings of the channels has only been chosen for reason of clearness and simplicity of the representation.

Although particular embodiments of the invention have been described in detail herein and shown in the accompanying drawing, it is to be understood that the invention is not limited to these particular embodiments, and that various changes and modifications may be effected therein without departing from the scope or spirit of the invention, except as defined in the appended claims.

What I claim is:

1. A V-belt sheave for a stepless V-belt transmission, comprising a pair of opposed conical disks, at least one of said disks being axially movable towards and away from the other to vary the speed ratio of the sheave, wherein at least one of said disks being provided with channels for cooling air, which channels ascend from the outside to the inside of said disk to the circumference of said disk and communicate with openings on the inside of said disk.

2. A V-belt sheave as claimed in claim 1, wherein said openings of said channels on the inside of said disk are formed as substantially radially arranged slots of relatively narrow width such that a deformation of the V-belt is prevented.

3. A V-belt sheave as claimed in claim 1, wherein said channels for conducting the cooling air are inclined against the direction of rotation of said disk.

4. A V-belt sheave as claimed in claim 1, wherein the cross-sectional area of said channels on the outside of said disk is bigger than on its inside.

5. A V-belt sheave for a stepless V-belt transmission, comprising: a pair of opposed disks with frusto-conical surfaces, at least one of said disks being axially movable towards and away from the other to vary the speed ratio of the sheave; at least one of said disks having channels communicating between openings on the inside and outside walls of the disk for the passage of cooling air therethrough, the portion of said inside disk wall opening closest to the axis of said disk being further from said axis than the portion of said outside disk wall opening closest to said axis, with the portion of said inside opening furthest from the axis of the disk being further from said axis than the portion of said outside disk opening furthest from said axis.

6. A V-belt sheave as defined in claim 5, wherein: the radial dimension of said inside wall openings is greater than the radial dimension of said outside wall openings, and the circumferential dimension of said inside opening is less than the circumferential dimension of said outside opening.

7. A V-belt sheave as defined in claim 6, wherein the cross-sectional area of said channels at said outside openings is greater than at said inside openings.

8. A V-belt sheave as defined in claim 6, wherein said inside wall openings are formed as substantially radial slots of relatively narrow width such that substantial deformation of the V-belt is prevented.

9. A V-belt sheave as defined in claim 6, wherein said channels for conducting the cooling air are inclined against the direction of rotation of said disks.

References Cited in the file of this patent

UNITED STATES PATENTS

| | | |
|---|---|---|
| 1,388,865 | Kimble | Aug. 30, 1921 |
| 1,957,654 | La Brie | May 8, 1934 |
| 2,057,435 | Kimble | Oct. 13, 1936 |
| 2,091,865 | Leveen | Aug. 31, 1937 |
| 2,237,164 | Rosenberg | Apr. 1, 1941 |
| 2,258,776 | L'Hommedieu et al. | Oct. 14, 1941 |